(12) United States Patent
Arakawa et al.

(10) Patent No.: US 12,078,750 B2
(45) Date of Patent: Sep. 3, 2024

(54) RECEIVER, RADAR APPARATUS INCLUDING RECEIVER, VEHICLE INCLUDING RECEIVER, AND COMMUNICATION SYSTEM INCLUDING RECEIVER

(71) Applicant: Murata Manufacturing Co., Ltd., Nagaokakyo (JP)

(72) Inventors: Nobuya Arakawa, Nagaokakyo (JP); Katsuhisa Kashiwagi, Nagaokakyo (JP); Ryo Saito, Nagaokakyo (JP); Koichi Ichige, Nagaokakyo (JP)

(73) Assignee: MURATA MANUFACTURING CO., LTD., Nagaokakyo (JP)

( * ) Notice: Subject to any disclaimer, the term of this patent is extended or adjusted under 35 U.S.C. 154(b) by 444 days.

(21) Appl. No.: 17/543,755

(22) Filed: Dec. 7, 2021

(65) Prior Publication Data
US 2022/0091230 A1    Mar. 24, 2022

Related U.S. Application Data

(63) Continuation of application No. PCT/JP2020/020625, filed on May 25, 2020.

(30) Foreign Application Priority Data

Jun. 25, 2019  (JP) .................................. 2019-117461

(51) Int. Cl.
*G01S 7/40* (2006.01)
*G01S 13/931* (2020.01)

(52) U.S. Cl.
CPC ............ *G01S 7/403* (2021.05); *G01S 13/931* (2013.01); *G01S 2013/93271* (2020.01)

(58) Field of Classification Search
CPC .............. G01S 7/403; G01S 13/931; G01S 2013/93271; G01S 13/42; H01Q 21/06; H01Q 21/08
See application file for complete search history.

(56) References Cited

U.S. PATENT DOCUMENTS 8,390,507 B2 *   3/2013  Wintermantel ....... G01S 7/0233
                                                     342/70
10,141,657 B2 *  11/2018  Kishigami ............ H01Q 21/08
(Continued)

FOREIGN PATENT DOCUMENTS

JP    2002-55152 A    2/2002
JP    2010-8319 A     1/2010
(Continued)

OTHER PUBLICATIONS

International Search Report and Written Opinion mailed on Jul. 21, 2020, received for PCT Application PCT/JP2020/020625, Filed on May 25, 2020, 9 pages including English Translation.
(Continued)

*Primary Examiner* — Peter M Bythrow
(74) *Attorney, Agent, or Firm* — XSENSUS LLP (57) ABSTRACT

A receiver accurately performs, using an annihilation filter, angle estimation in two-dimensional directions of an incoming wave. The receiver operates with at least two linear array antenna. The receiver may be implemented in a radar apparatus includes the receiver, as well as a vehicle and a communication system, which also include the receiver.

20 Claims, 5 Drawing Sheets

(56) References Cited

U.S. PATENT DOCUMENTS

| | | | |
|---|---|---|---|
| 11,275,145 B2* | 3/2022 | Aoki | H01Q 21/06 |
| 2006/0193371 A1* | 8/2006 | Maravic | H03H 17/0213 |
| | | | 375/130 |
| 2011/0225218 A1* | 9/2011 | Eldar | H03H 17/06 |
| | | | 708/3 |
| 2013/0038479 A1* | 2/2013 | Eldar | H03M 1/121 |
| | | | 341/122 |
| 2015/0285905 A1* | 10/2015 | Eldar | G01S 7/2923 |
| | | | 342/196 |
| 2016/0345286 A1 | 11/2016 | Jamieson et al. | |
| 2018/0088224 A1* | 3/2018 | Kishigami | G01S 13/46 |
| 2018/0284216 A1* | 10/2018 | Aoki | H01Q 21/06 |
| 2019/0137616 A1* | 5/2019 | Kishigami | G01S 13/48 |
| 2019/0187266 A1* | 6/2019 | Yamanouchi | G01S 13/04 |
| 2019/0310358 A1* | 10/2019 | Lee | G01S 13/931 |
| 2022/0094397 A1* | 3/2022 | Wu | H04B 7/0617 |
| 2022/0268884 A1* | 8/2022 | Wu | G01S 7/2883 |

FOREIGN PATENT DOCUMENTS

| | | |
|---|---|---|
| JP | 2014-235109 A | 12/2014 |
| JP | 2019-15554 A | 1/2019 |
| WO | 2011/092813 A1 | 8/2011 |

OTHER PUBLICATIONS

Wang et al., "Frequency Diverse MIMO Radar Sparse Imaging Using Annihilating Filter", China Satellite Maritime Tracking and Control Department, IEEE, 2018, 4 pages.

English translation of Written Opinion mailed on Jul. 21, 2020, received for PCT Application PCT/JP2020/020625.

* cited by examiner

RECEIVER, RADAR APPARATUS INCLUDING RECEIVER, VEHICLE INCLUDING RECEIVER, AND COMMUNICATION SYSTEM INCLUDING RECEIVER

CROSS-REFERENCE TO RELATED APPLICATIONS

The present application claims priority to Japanese patent application JP2019-117461, filed Jun. 25, 2019, and PCT/JP2020/020625, filed May 25, 2020, the entire contents of each of which being incorporated herein by reference.

TECHNICAL FIELD

The present disclosure relates to a receiver that performs angle estimation of an incoming direction of an incoming wave, a radar apparatus including the receiver, a vehicle including the receiver, and a communication system including the receiver.

BACKGROUND ART

As a technique for performing angle estimation of an incoming direction of an incoming wave, for example, an angle estimation technique using an AF (Annihilating Filter) method with a MIMO (Multiple-Input Multiple-Output) radar apparatus disclosed in Non-patent document 1 has been available.

The MIMO radar apparatus described in Non-patent document 1 includes an equally-spaced linear array including reception antennas arranged with an equal interval therebetween. For such a MIMO radar apparatus, a filter that has a transfer function H(z) with inputs of reception signals x(n), x(n+1), x(n+2), and so on received at the reception antennas and outputs y of 0 is required. Thus, the phase at a zero of the filter can be seen, a phase difference of an incoming wave between the reception antennas can be obtained, and the angle of the direction in which the incoming wave arrives can be accurately estimated on the basis of the obtained phase difference.

CITATION LIST

Non Patent Document

Non patent document 1: Tianyun Wang, Bing Liu, Qiang Wei, Kai Kang, Yong Liu, "Frequency Diverse MIMO Radar Sparse Imaging Using Annihilating Filter", China Satellite Maritime Tracking and Control Department, Jiangyin, 214431, P. R. China, 978-1-5386-7946-3/18 2018 IEEE

SUMMARY

Technical Problems

However, as recognized by the present inventors, in the angle estimation technique using the known AF method mentioned above, only an azimuth angle can be estimated, and only one-dimensional angle estimation can be performed.

An aspect of the present disclosure is to provide a reception technique capable of accurately performing, using an AF method, two-dimensional angle estimation, which includes estimation of an elevation angle as well as an azimuth angle in a direction in which an incoming wave arrives.

Solutions to Problems

To these ends,
a receiver according to the present disclosure includes a receiver including:
azimuth angle phase difference first estimation circuitry configured to
  input a plurality of first reception signal groups each including first reception signals received at a plurality of first reception antennas that are part of a first linear array antenna, a number of the first reception signals being larger than a number of incoming waves by one, and
  apply a first annihilation filter (AF) to the first reception signal groups to estimate azimuth angle phase differences of the incoming waves for respective of the first reception antennas, the estimate of azimuth angle phase differences for the first reception antennas being based on phases that occur at zeros of a transfer function of the first AF;
azimuth angle phase difference second estimation circuitry configured to
  input a plurality of second reception signal groups each including second reception signals received at a plurality of second reception antennas that are part of a second linear array antenna arranged at a height that is different than the first linear array antenna, a number of the second reception signals being larger than the number of the incoming waves by one, and
  apply a second AF to the second reception signal groups to estimate azimuth angle phase differences of the incoming waves for respective of the second reception antennas, the estimate of the azimuth angle phase differences of the incoming waves for the second reception antennas being based on phases that occur at zeros of a transfer function of the second AF;
incoming wave signal first estimation circuitry that estimates amplitudes and phases of signals of the incoming waves that arrive at a reference first reception antenna that is included in the first linear array antenna, based on azimuth angle phase differences of incoming waves among the first reception antennas estimated by the azimuth angle phase difference first estimation circuitry and the first reception signals;
incoming wave signal second estimation circuitry that estimates amplitudes and phases of signals of incoming waves arriving at a reference second reception antenna that is included in the second linear array antenna, based on the azimuth angle phase differences of the incoming waves among the second reception antennas estimated by the azimuth angle phase difference second estimation circuitry and the second reception signals;
elevation angle phase difference estimation circuitry that estimates phase differences that correspond to the height for the incoming waves as elevation angle phase differences, based on the signals estimated by the incoming wave signal first estimation circuitry that arrive at the reference first reception antenna and the signals estimated by the incoming wave signal second estimation circuitry that arrive at the reference second reception antenna; and incoming direction two-dimensional estimation circuitry that is configured to
estimate elevation angles of incoming directions of incoming waves based on the elevation angle phase differences estimated by the elevation angle phase difference estimation circuitry, and
estimate azimuth angles of incoming directions of incoming waves based on the azimuth angle phase differences estimated by the azimuth angle phase difference first estimation circuitry or the azimuth angle phase difference second estimation circuitry.

Furthermore, a radar apparatus according to the present disclosure includes the receiver described above and a transmission signal generator that generates a transmission signal;
a transmission antenna that transmits, as a transmission wave, the transmission signal generated by the transmission signal generator; and
object detection circuitry configured to
perform, in two-dimensional directions, angle estimation of a position of an object based on elevation angles and azimuth angles of incoming directions of incoming waves estimated by the receiver, the incoming waves being waves that result as a consequence of the transmission wave being reflected off the object, and
estimate a distance to the object.

Furthermore, a vehicle according to the present disclosure includes the radar apparatus described above.

Furthermore, a communication system according to the present disclosure includes the receiver described above, angle estimation circuitry provided in a base station or a portable device and configured to estimate, in two-dimensional directions, configured to estimate an angle corresponding to a position at which the portable device or the base station that has transmitted incoming waves is located based on elevation angles and azimuth angles of the incoming waves estimated by the receiver; and
a transmitter provided in the base station or the portable device that is configured to
perform beamforming directed to the angle estimated by the angle estimation circuitry, and
perform directivity control to increase transmission output of a transmission wave transmitted towards the position in which the portable device or the base station is located.

Furthermore, a communication system according to the present disclosure includes the receiver described above, angle estimation circuitry provided in a base station or a portable device and configured to estimate, in two-dimensional directions, configured to estimate an angle corresponding to a position at which the portable device or the base station that has transmitted incoming waves is located based on elevation angles and azimuth angles of the incoming waves estimated by the receiver; and
another receiver that is provided in the portable device or the base station, the another receiver is configured to
perform beamforming at the angle estimated by the angle estimation circuitry, and
perform directivity control to increase reception sensitivity of a reception wave received from a direction corresponding to the position in which the base station or the portable device is located.

Furthermore, a position detection system according to the present disclosure includes the receiver discussed above, a plurality of transmitters that output transmission waves and are attached to targets; and angle estimation circuitry that performs, in two-dimensional directions, angle estimation of a position at which each of the targets is located based on elevation angles and azimuth angles of directions of incoming waves estimated by the receiver, wherein
the receiver receives each of the transmission waves output from the plurality of transmitters as the incoming waves.

Advantageous Effects

According to the present disclosure, a receiver that is capable of accurately performing, using an AF method, angle estimation in two-dimensional directions of incoming waves, a radar apparatus including the receiver, a vehicle including the receiver, and a communication system including the receiver can be provided.

DESCRIPTION OF EMBODIMENTS

A receiver according to an embodiment of the present disclosure, a radar apparatus including the receiver, a vehicle including the receiver, and a communication system including the receiver will be described below. In the description provided below, m, n, and k represent natural numbers.

Figure 1:
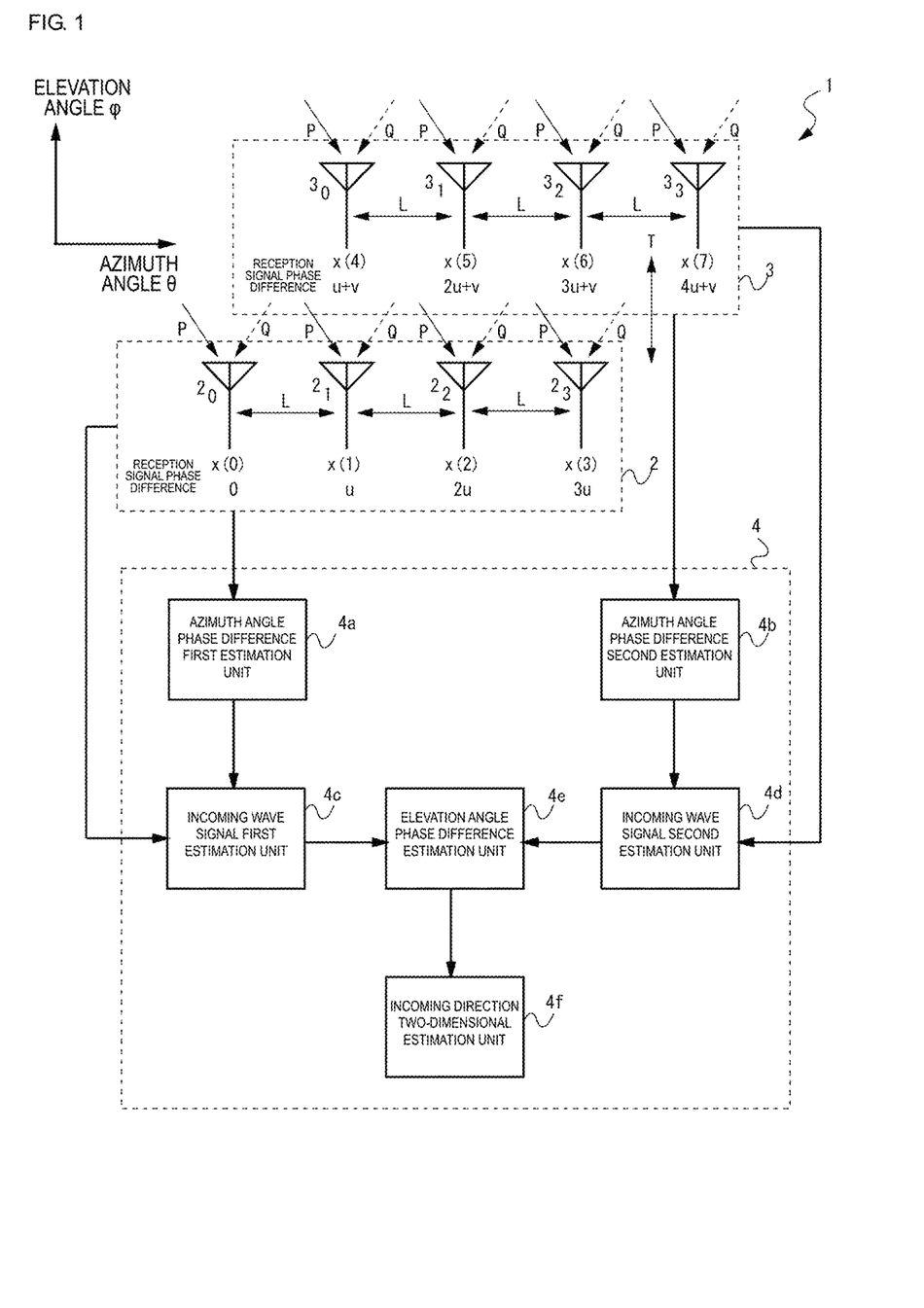
FIG. 1 is a block diagram illustrating a schematic configuration of a receiver according to an embodiment of the present disclosure.

FIG. 1 is a block diagram illustrating a schematic configuration of a receiver 1 according to an embodiment of the present disclosure.

The receiver 1 includes a first linear array antenna 2, a second linear array antenna 3, and an arithmetic device 4.

The first linear array antenna 2 includes first reception antennas $2_0$, $2_1$, $2_2$, . . . , and $2_n$, the number of which is larger than the number of incoming waves by at least one, arranged with an equal interval L therebetween in a straight line. In this embodiment, it is assumed that two waves, an incoming wave P indicated by a solid line in the drawing and an incoming wave Q indicated by a dotted line in the drawing, arrive at the receiver 1. The first linear array antenna 2 includes four first reception antennas $2_0$, $2_1$, $2_2$, and $2_3$, the number of which is larger than the number of the incoming waves P and Q, which is two, by two, arranged with an equal interval L therebetween in a straight line. The first reception antennas $2_0$, $2_1$, $2_2$, and $2_3$ receive first reception signals $x(0)$, $x(1)$, $x(2)$, and $x(3)$, respectively, represented by equation (1).

[Math. 1]

$$x(0) = A_1 e^{j\alpha_1} + A_2 e^{j\alpha_2}$$

$$x(1) = A_1 e^{j(\alpha_1 + u_1)} + A_2 e^{j(\alpha_2 + u_2)}$$

$$x(2) = A_1 e^{j(\alpha_1 + 2u_1)} + A_2 e^{j(\alpha_2 + 2u_2)}$$

$$x(3) = A_1 e^{j(\alpha_1 + 3u_1)} + A_2 e^{j(\alpha_2 + 3u_2)} \quad (1)$$

The first reception signals $x(0)$, $x(1)$, $x(2)$, and $x(3)$ have different phases for the corresponding first reception antennas $2_0$, $2_1$, $2_2$, and $2_3$ according to the incoming waves P and Q by phase differences (azimuth angle phase differences) $u_1$ and $u_2$ corresponding to the interval L, on the basis of phases $\alpha_1$ and $\alpha_2$ of the incoming waves P and Q received at the reference first reception antenna $2_0$, which is one of the four first reception antennas $2_0$, $2_1$, $2_2$, and $2_3$, and have amplitudes $A_1$ and $A_2$ corresponding to the incoming waves P and Q.

The second linear array antenna 3 includes second reception antennas $3_0$, $3_1$, $3_2$, and $3_3$, the number of which is larger than the number of the incoming waves by at least one, arranged at a height different from that of the first linear array antenna 2 and arranged with the interval L, which is the same as the interval L for the first linear array antenna 2, therebetween in a straight line parallel to the straight line in which the first linear array antenna 2 is arranged. In this embodiment, the second linear array antenna 3 includes the four second reception antennas $3_0$, $3_1$, $3_2$, and $3_3$, the number of which is larger than the number of the incoming waves P and Q, which is two, by two, arranged at a height T from the first linear array antenna 2 and arranged with the equal interval L therebetween in the straight line parallel to the straight line in which the first linear array antenna 2 is arranged. The second reception antennas $3_0$, $3_1$, $3_2$, and $3_3$ receive second reception signals $x(4)$, $x(5)$, $x(6)$, and $x(7)$, respectively, represented by equation (2).

[Math. 2]

$$x(4) = A_1 e^{j(\alpha_1 + u_1 + v_1)} + A_2 e^{j(\alpha_2 + u_2 + v_2)}$$

$$x(5) = A_1 e^{j(\alpha_1 + 2u_1 + v_1)} + A_2 e^{j(\alpha_2 + 2u_2 + v_2)}$$

$$x(6) = A_1 e^{j(\alpha_1 + 3u_1 + v_1)} + A_2 e^{j(\alpha_2 + 3u_2 + v_2)}$$

$$x(7) = A_1 e^{j(\alpha_1 + 4u_1 + v_1)} + A_2 e^{j(\alpha_2 + 4u_2 + v_2)} \quad (2)$$

The second reception signals $x(4)$, $x(5)$, $x(6)$, and $x(7)$ have different phases for the corresponding second reception antennas $3_0$, $3_1$, $3_2$, and $3_3$ according to the incoming waves P and Q by phase differences (azimuth angle phase differences) $u_1$ and $u_2$ corresponding to the interval L, on the basis of phases $\alpha_1 + u_1 + v_1$ and $\alpha_2 + u_2 + v_2$ of the incoming waves P and Q including phase differences (elevation angle phase differences) $v_1$ and $v_2$ corresponding to the height T, received at the reference second reception antenna $3_0$, which is one of the four second reception antennas $3_0$, $3_1$, $3_2$, and $3_3$, and have amplitudes $A_1$ and $A_2$ corresponding to the incoming waves P and Q.

The arithmetic device 4 includes a processor such as an MPU (Micro Processing Unit) and controls various units in accordance with a program defining an operation procedure of the processor stored in a storing unit. The arithmetic device 4 includes, as functional blocks, an azimuth angle phase difference first estimation unit 4a, an azimuth angle phase difference second estimation unit 4b, an incoming wave signal first estimation unit 4c, an incoming wave signal second estimation unit 4d, an elevation angle phase difference estimation unit 4e, and an incoming direction two-dimensional estimation unit 4f. Each of the above described "units" is implemented in circuitry that is programmable, electronic circuitry with dedicated functionality, and/or a hybrid of the two. The electronic circuitry may include various forms including, for example, one or more computers, programmable logic circuitry, one or more CPUs, GPUs, or MPUs as discussed above, and/or field-programmable gate arrays (FPGA), and/or programmable logic arrays (PLA) that may execute the computer readable program instructions by using information from the computer readable program instructions to configure or customize the electronic circuitry, in order to perform aspects of the present disclosure, including the azimuth angle phase difference first estimation unit 4a, azimuth angle phase difference second estimation unit 4b, incoming wave signal first estimation unit 4c, incoming wave signal second estimation unit 4d, elevation angle phase difference estimation unit 4e, and the incoming direction two-dimensional estimation unit 4f. Computer readable program instructions, stored in a non-transitory computer readable medium (RAM, ROM, or the like) that may implement the systems and methods described in this disclosure may be provided to one or more processors (and/or one or more cores within a processor) of a general purpose computer, special purpose computer, or other programmable apparatus to produce a machine, such that the instructions, which execute via the processor of the computer or other programmable apparatus, create a system for implementing the functions specified in the flow diagrams and block diagrams in the present disclosure. These computer readable program instructions may also be stored in a computer readable storage medium that can direct a computer, a programmable apparatus, and/or other devices to function in a particular manner, such that the computer readable storage medium having stored instructions is an article of manufacture including instructions which implement aspects of the functions specified in the flow diagrams and block diagrams in the present disclosure. Moreover, the electronic circuitry may be common circuitry that is implemented as a single semiconductor chip, a plurality of chips contained in a common module, or multiple chips/module contained on a single module board. The electronic circuitry may also be implemented in a distributed fashion with the functions performed on more that one circuit that are either interconnected via a conductive path, a wireless communication connection, or a hybrid of the two.

The azimuth angle phase difference first estimation unit 4a receives a plurality of first reception signal groups each including first reception signals, the number of which is larger than the number of the incoming waves by one, received at the first reception antennas $2_0$, $2_1$, $2_2$, and $2_3$. In this embodiment, the azimuth angle phase difference first estimation unit 4a receives two first reception signal groups: a first first reception signal group of $x(2)$, $x(1)$, and $x(0)$; and a second first reception signal group of $x(3)$, $x(2)$, and $x(1)$, each including three first reception signals, the number of which is larger than the number of the incoming waves P and Q, which is two, by one. The azimuth angle phase difference first estimation unit 4a estimates, using the AF method, the azimuth angle phase differences $u_1$ and $u_2$ of the incoming waves P and Q among the first reception antennas $2_0$, $2_1$, $2_2$, and $2_3$, on the basis of phases at zeros of the transfer function $H(z)$ that outputs 0 for inputs of the first reception signal groups.

Figure 2:
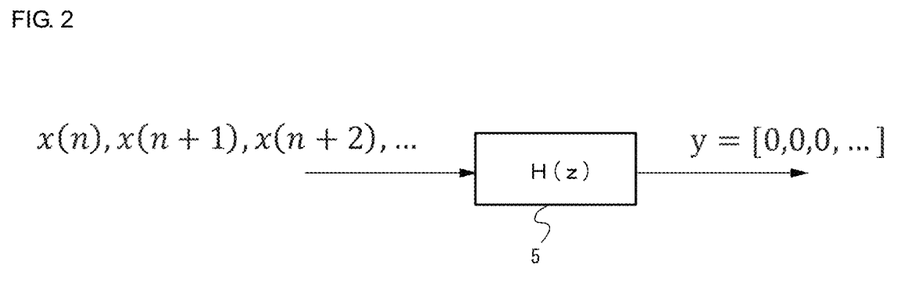
FIG. 2 is a diagram for explaining a transfer function used in a receiver according to an embodiment.

As illustrated in FIG. 2, in the AF method, reception signals x(n), x(n+1), x(n+2), and so on to be input to a filter 5 is divided into groups each including a plurality of reception signals, the number of which is equal to the number K of incoming waves plus one, and filter structure is set such that filter outputs y of the transfer function H(z) of the filter 5 for inputs are 0. Typically, this transfer function H(z) is represented by equation (12), where a phase difference between antennas is represented by z and filter coefficients are represented by $h_0, h_1, \ldots, h_K-1,$ and $h_K$.

[Math. 12]

$$H(z) = h_0 z^K + h_1 z^{K-1} + \ldots + h_{K-1} z + h_K \quad (12)$$

In this embodiment, the number K of incoming waves plus one is three. Thus, the transfer function H(z) is represented by equation (4).

[Math. 4]

$$H(z) = h_0 z^2 + h_1 z + h_2 \quad (4)$$

Filter outputs obtained from the first first reception signal group of x(2), x(1), and x(0) and the second first reception signal group of x(3), x(2), and x(1) input to the filter 5 with the transfer function H(z) are 0. Thus, equations (3-1) and (3-2) are satisfied.

[Math. 3]

$$\begin{aligned} h_0 x(2) + h_1 x(1) + h_2 x(0) = 0 & \ldots (3-1) \\ h_0 x(3) + h_1 x(2) + h_2 x(1) = 0 & \ldots (3-2) \end{aligned} \quad (3)$$

Equation (3-1) is modified into equation (13).

[Math. 13]

$$\begin{aligned} & h_0 x(2) + h_1 x(1) + h_2 x(0) \\ &= h_0 (A_1 e^{j(\alpha_1 + 2u_1)} + A_2 e^{j(\alpha_2 + 2u_2)}) + \\ & \quad h_1 (A_1 e^{j(\alpha_1 + u_1)} + A_2 e^{j(\alpha_2 + u_2)}) + h_2 (A_1 e^{j\alpha_1} + A_2 e^{j\alpha_2}) \\ &= A_1 e^{j\alpha_1} \underline{\frac{(h_0 e^{j2u_1} + h_1 e^{ju_1} + h_2)}{\text{COMMON PART } a}} + A_2 e^{j\alpha_2} \underline{\frac{(h_0 e^{j2u_2} + h_1 e^{ju_2} + h_2)}{\text{COMMON PART } b}} \\ &= 0 \end{aligned} \quad (13)$$

Furthermore, equation (3-2) is modified into equation (14).

[Math. 14]

$$\begin{aligned} & h_0 x(3) + h_1 x(2) + h_2 x(1) \\ &= h_0 (A_1 e^{j(\alpha_1 + 3u_1)} + A_2 e^{j(\alpha_2 + 3u_2)}) + \\ & \quad h_1 (A_1 e^{j(\alpha_1 + 2u_1)} + A_2 e^{j(\alpha_2 + 2u_2)}) + h_2 (A_1 e^{j\alpha_1 u_1} + A_2 e^{j(\alpha_2 + u_2)}) \\ &= A_1 e^{j(\alpha_1 + u_1)} \underline{\frac{(h_0 e^{j2u_1} + h_1 e^{ju_1} + h_2)}{\text{COMMON PART } a}} + \\ & \quad A_2 e^{j(\alpha_2 + u_2)} \underline{\frac{(h_0 e^{j2u_2} + h_1 e^{ju_2} + h_2)}{\text{COMMON PART } b}} \\ &= 0 \end{aligned} \quad (14)$$

To obtain 0 for the equation (13) and the equation (14) at the same time, both a "common part a" indicated with a solid underline in each of the equation (13) and the equation (14) and a "common part b" indicated with a dotted underline in each of the equation (13) and the equation (14) need to be 0. A term including the common part a corresponds to the incoming wave P, and a term including the common part b corresponds to the incoming wave Q. Thus, by changing values of three filter coefficients $h_0, h_1,$ and $h_3$, the values of the filter coefficients $h_0, h_1,$ and $h_3$ that converge the values of the common parts a and b to 0 are calculated.

After determining the values of the filter coefficients $h_0, h_1,$ and $h_3$, the azimuth angle phase difference first estimation unit 4a calculates a phase difference $z_1$ for the incoming wave P and a phase difference $z_2$ for the incoming wave Q among the first reception antennas $2_0, 2_1, 2_2,$ and $2_3$ such that the transfer function H(z) represented by the equation (4) becomes 0, that is, the phase differences $z_1$ and $z_2$ that satisfy equation (15), and obtains zeros of the filter 5.

[Math. 15]

$$\begin{aligned} h_0 z_1^2 + h_1 z_1 + h_2 &= 0 \\ h_0 z_2^2 + h_1 z_2 + h_2 &= 0 \end{aligned} \quad (15)$$

Left sides of the equation (15) have the same equation shapes as the common parts a and the common parts b in the equations (13) and (14), and the filter coefficients $h_0, h_1,$ and $h_3$ should be values that obtain 0 for the common parts a and b. Thus, zeros of the filter 5 are represented as in equation (5).

[Math. 5]

$$z_1 = e^{ju_1}$$

$$z_2 = e^{ju_2} \quad (5)$$

The azimuth angle phase difference first estimation unit 4a estimates, using the AF method, azimuth angle phase differences $u_1$ and $u_2$ of the incoming waves P and Q among the first reception antennas $2_0, 2_1, 2_2,$ and $2_3$, on the basis of the phases at the zeros.

Furthermore, in a similar manner, the azimuth angle phase difference second estimation unit 4b receives two second reception signal groups: a first second reception signal group of x(6), x(5), and x(4); and a second second reception signal group of x(7), x(6), and x(5), each including three second reception signals, the number of which is larger than the number of the incoming waves P and Q, received at the second reception antennas $3_0, 3_1, 3_2,$ and $3_3$. The azimuth angle phase difference second estimation unit 4b estimates, using the AF method, the azimuth angle phase differences $u_1$ and $u_2$ of the incoming waves P and Q among the second reception antennas $3_0, 3_1, 3_2,$ and $3_3$, on the basis of phases at zeros of the transfer function H(z) that outputs 0 for inputs of the second reception signal groups.

That is, filter outputs obtained from the second reception signal group of x(6), x(5), and x(4) and the second reception signal group of x(7), x(6), and x(5) input to the filter 5 and the transfer function H(z) are 0. Thus, equations (6-1) and (6-2) are satisfied.

[Math. 6]

$$\begin{aligned} h_0 x(6) + h_1 x(5) + h_2 x(4) = 0 & \ldots (6-1) \\ h_0 x(7) + h_1 x(6) + h_2 x(5) = 0 & \ldots (6-2) \end{aligned} \quad (6)$$

The equations (6-1) and (6-2) are modified into those similar to the equations (13) and (14), and the azimuth angle phase difference second estimation unit 4b calculates values of the filter coefficients $h_0, h_1,$ and $h_3$ that converge values of the common parts a and b to 0. After determining the values of the filter coefficients $h_0$, $h_1$, and $h_3$, the azimuth angle phase difference second estimation unit 4b calculates a phase difference $z_1$ for the incoming wave P and a phase difference $z_2$ for the incoming wave Q among the second reception antennas $3_0$, $3_1$, $3_2$, and $3_3$ such that the transfer function H(z) represented by the equation (4) becomes 0, that is, the phase differences $z_1$ and $z_2$ that satisfy the equation (15), and obtains zeros of the filter 5. Then, in a manner similar to the azimuth angle phase difference first estimation unit 4a, the azimuth angle phase difference second estimation unit 4b estimates, using the AF method, the azimuth angle phase differences $u_1$ and $u_2$ of the incoming waves P and Q among the second reception antennas $3_0$, $3_1$, $3_2$, and $3_3$, in accordance with the equation (5), on the basis of the obtained phases at the zeros.

The incoming wave signal first estimation unit 4c estimates, in accordance with equation (7), amplitudes $A_1$ and $A_2$ and phases $\alpha_1$ and $\alpha_2$ of signals $S_1$ and $S_2$ of the incoming wave arriving at the reference first reception antenna $2_0$, on the basis of the known azimuth angle phase differences $u_1$ and $u_2$ of the incoming waves P and Q among the first reception antennas $2_0$, $2_1$, $2_2$, and $2_3$ estimated by the azimuth angle phase difference first estimation unit 4a and the known first reception signals x(0), x(1), x(2), and x(3).

[Math. 7]

$$x(0)=A_1 e^{j\alpha_1}+A_2 e^{j\alpha_2}=S_1+S_2$$

$$x(1)=S_1 e^{ju_1}+S_2 e^{ju_2}$$

$$x(2)=S_1 e^{j2u_1}+S_2 e^{j2u_2}$$

$$x(3)=S_1 e^{j3u_1}+S_2 e^{j3u_2} \quad (7)$$

Furthermore, the incoming wave signal second estimation unit 4d estimates, in accordance with equation (8), amplitudes $A_1$ and $A_2$ and phases $\alpha_1+u_1+v_1$ and $\alpha_2+u_2+v_2$ of signals $S_1'$ and $S_2'$ of the incoming wave arriving at the reference second reception antenna $3_0$, on the basis of the known azimuth angle phase differences $u_1$ and $u_2$ of the incoming waves P and Q among the second reception antennas $3_0$, $3_1$, $3_2$, and $3_3$ estimated by the azimuth angle phase difference second estimation unit 4b and the known second reception signals x(4), x(5), x(6), and x(7).

[Math. 8]

$$x(4)=A_1 e^{j(\alpha_1+u_1+v_1)}+A_2 e^{j(\alpha_2+u_2+v_2)}=S_1'+S_2'$$

$$x(5)=S_1' e^{ju_1}+S_2' e^{ju_2}$$

$$x(6)=S_1' e^{j2u_1}+S_2' e^{j2u_2}$$

$$x(7)=S_1' e^{j3u_1}+S_2' e^{j3u_2} \quad (8)$$

The elevation angle phase difference estimation unit 4e estimates, in accordance with equation (9), phase differences corresponding to the height T for the incoming waves P and Q as elevation angle phase differences $v_1$ and $v_2$, on the basis of the amplitudes $A_1$ and $A_2$ and the phases $\alpha_1$ and $\alpha_2$ of the signals $S_1$ and $S_2$ of the incoming wave estimated, by the incoming wave signal first estimation unit 4c, to arrive at the reference first reception antenna $2_0$ and the amplitudes $A_1$ and $A_2$ and the phases $\alpha_1+u_1+v_1$ and $\alpha_2+u_2+v_2$ of the signals $S_1'$ and $S_2'$ of the incoming wave estimated, by the incoming wave signal second estimation unit 4d, to arrive at the reference second reception antenna $3_0$.

[Math. 9]

$$\frac{S_{1'}}{S_1} e^{-ju_1} = e^{jv_1}$$

$$\frac{S_{2'}}{S_2} e^{-ju_2} = e^{jv_2} \quad (9)$$

The incoming direction two-dimensional estimation unit 4f estimates, in accordance with equation (10), elevation angles $\varphi_1$ and $\varphi_2$ in incoming directions of the incoming waves P and Q, on the basis of the elevation angle phase differences $v_1$ and $v_2$ estimated by the elevation angle phase difference estimation unit 4e.

[Math. 10]

$$v_1=\pi \sin(\varphi_1)$$

$$v_2=\pi \sin(\varphi_2) \quad (10)$$

Then, the incoming direction two-dimensional estimation unit 4f estimates, in accordance with equation (11), azimuth angles $\theta_1$ and $\theta_2$ in the incoming directions of the incoming waves P and Q, on the basis of the azimuth angle phase differences $u_1$ and $u_2$ estimated by the azimuth angle phase difference first estimation unit 4a or the azimuth angle phase difference second estimation unit 4b.

[Math. 11]

$$u_1=\pi \sin(\theta_1)\cos(\varphi_1)$$

$$u_2=\pi \sin(\theta_2)\cos(\varphi_2) \quad (11)$$

Figure 3:
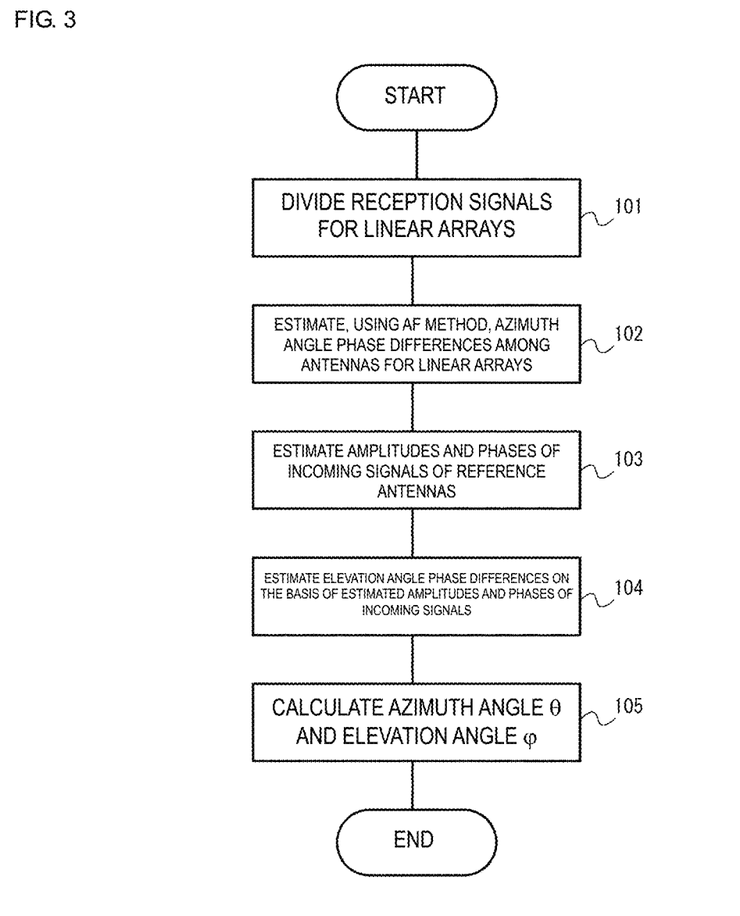
FIG. 3 is a flowchart illustrating an operation of an arithmetic device in a receiver according to an embodiment.

FIG. 3 is a flowchart schematically illustrating an operation of the arithmetic device 4 in the receiver 1 according to an embodiment.

For angle estimation in incoming directions of the incoming waves P and Q in accordance with the AF method, the arithmetic device 4 first divides, for the first linear array antenna 2 and the second linear array antenna 3, the first reception signals x(0), x(1), x(2), and x(3) represented by the equation (1) and the second reception signals x(4), x(5), x(6), and x(7) represented by the equation (2) that are received by the first linear array antenna 2 and the second linear array antenna 3, respectively, into groups each including three reception signals (see step 101 in FIG. 3). Then, the obtained first first reception signal group of the first reception signals x(2), x(1), and x(0) and second first reception signal group of the first reception signals x(3), x(2), and x(1) are input to the filter 5 for the first linear array antenna 2, and the obtained first second reception signal group of the second reception signals x(6), x(5), and x(4) and second second reception signal group of the second reception signals x(7), x(6), and x(5) are input to the filter 5 for the second linear array antenna 3.

Next, in the arithmetic device 4, the azimuth angle phase difference first estimation unit 4a and the azimuth angle phase difference second estimation unit 4b calculate, using the AF method for the first linear array antenna 2 and the second linear array antenna 3, respectively, the filter coefficients $h_0$, $h_1$, and $h_3$ that obtain 0 as filter outputs of the filter 5 that has the transfer function H(x) represented by the equation (4), in accordance with the equations (3-1) and (3-2) and the equations (6-1) and (6-2), respectively. Then, zeros of the filter 5 that has the calculated filter coefficients $h_0$, $h_1$, and $h_3$ are obtained using the equation (5), and the azimuth angle phase differences $u_1$ and $u_2$ among the first reception antennas $2_0$, $2_1$, $2_2$, and $2_3$ and the second reception antennas $3_0$, $3_1$, $3_2$, and $3_3$ are estimated, on the basis of the zeros of the filter 5 represented by the equation (5) (see step 102).

Next, in the arithmetic device 4, the incoming wave signal first estimation unit 4c estimates, in accordance with the equation (7), the amplitudes $A_1$ and $A_2$ and the phases $\alpha_1$ and $\alpha_2$ of the signals $S_1$ and $S_2$ of the incoming wave arriving at the reference first reception antenna $2_0$, and the incoming wave signal second estimation unit 4d estimates, in accordance with the equation (8), the amplitudes $A_1$ and $A_2$ and the phases $\alpha_1+u_1+v_1$ and $\alpha_2+u_2+v_2$ of the signals $S_1'$ and $S_2'$ of the incoming wave arriving at the reference second reception antenna $3_0$ (see step 103). Next, in the arithmetic device 4, the elevation angle phase difference estimation unit 4e estimates, in accordance with the equation (9), the elevation angle phase differences $v_1$ and $v_2$ for the incoming waves P and Q, on the basis of the amplitudes $A_1$ and $A_2$ and the phases $\alpha_1$ and $\alpha_2$ of the signals $S_1$ and $S_2$ of the incoming wave and the amplitudes $A_1$ and $A_2$ and the phases $\alpha_1+u_1+v_1$ and $\alpha_2+u_2+v_2$ of the signals $S_1'$ and $S_2'$ of the incoming wave (see step 104). Then, in the arithmetic device 4, the incoming direction two-dimensional estimation unit 4f estimates, in accordance with the equation (10), the elevation angles $\varphi_1$ and $\varphi_2$ in the incoming directions of the incoming waves P and Q, on the basis of the elevation angle phase differences $v_1$ and $v_2$, and estimates, in accordance with the equation (11), the azimuth angles $\theta_1$ and $\theta_2$ in the incoming directions of the incoming waves P and Q, on the basis of the azimuth angle phase differences $u_1$ and $u_2$ (see step 105).

In the receiver 1 according to this embodiment, for the first linear array antenna 2 and the second linear array antenna 3, the azimuth angle phase differences $u_1$ and $u_2$ of the incoming waves P and Q are estimated using the AF method by the azimuth angle phase difference first estimation unit 4a and the azimuth angle phase difference second estimation unit 4b. Thus, on the basis of the azimuth angle phase differences $u_1$ and $u_2$, the incoming direction two-dimensional estimation unit 4f can estimate the azimuth angles $\theta_1$ and $\theta_2$ in the incoming directions of the incoming waves P and Q.

Furthermore, the second linear array antenna 3 is arranged at the height T that is different from that of the first linear array antenna 2. Thus, phase differences (elevation angle phase differences) $v_1$ and $v_2$ corresponding to the height T are included in the phases of the second reception signals x(4), x(5), x(6), and x(7) of the incoming waves P and Q received at the second reception antennas $3_0$, $3_1$, $3_2$, and $3_3$ forming the second linear array antenna 3. Therefore, the amplitudes $A_1$ and $A_2$ and the phases $\alpha_1$ and $\alpha_2$ of the signals $S_1$ and $S_2$ of the incoming wave arriving at the reference first reception antenna $2_0$ are estimated by the incoming wave signal first estimation unit 4c, on the basis of the azimuth angle phase differences $u_1$ and $u_2$ of the incoming waves P and Q among the first reception antennas $2_0$, $2_1$, $2_2$, and $2_3$ estimated by the azimuth angle phase difference first estimation unit 4a and the first reception signals x(0), x(1), x(2), and x(3), and the amplitudes $A_1$ and $A_2$ and the phases $\alpha_1+u_1+v_1$ and $\alpha_2+u_2+v_2$ of the signals $S_1'$ and $S_2'$ of the incoming wave arriving at the reference second reception antenna $3_0$ are estimated by the incoming wave signal second estimation unit 4d, on the basis of the azimuth angle phase differences $u_1$ and $u_2$ of the incoming waves P and Q among the second reception antennas $3_0$, $3_1$, $3_2$, and $3_3$ estimated by the azimuth angle phase difference second estimation unit 4b and the second reception signals x(4), x(5), x(6), and x(7). Then, on the basis of the estimated amplitudes $A_1$ and $A_2$ and phases $\alpha_1$ and $\alpha_2$ of the signals $S_1$ and $S_2$ of the incoming wave and the estimated amplitudes $A_1$ and $A_2$ and phases $\alpha_1+u_1+v_1$ and $\alpha_2+u_2+v_2$ of the signals $S_1'$ and $S_2'$ of the incoming wave, the elevation angle phase difference estimation unit 4e can estimate, as the elevation angle phase differences $v_1$ and $v_2$, phase differences corresponding to the height T of the second linear array antenna 3, for the incoming waves P and Q. The elevation angles $\varphi_1$ and $\varphi_2$ in the incoming directions of the incoming waves P and Q can be estimated by the incoming wave signal second estimation unit 4d, on the basis of the estimated elevation angle phase difference $v_1$ and $v_2$.

As a result, the azimuth angles $\theta_1$ and $\theta_2$ and the elevation angles $\varphi_1$ and $\varphi_2$ in the incoming directions of the incoming waves P and Q are estimated, and angle estimation in the two-dimensional directions of the incoming waves P and Q, which has not previously been able to be performed using the AF method, can now, in accordance with the teachings of the present disclosure, be performed in accordance with the AF method with high accuracy compared to procedures such as fast Fourier transform (FFT) and compressed sensing.

In the embodiment described above, the case where the first reception antenna $2_0$ is used as the reference first reception antenna and the second reception antenna $3_0$ is used as the reference second reception antenna has been described. However, any of the first reception antennas $2_0$, $2_1$, $2_2$, and $2_3$ and any of the second reception antennas $3_0$, $3_1$, $3_2$, and $3_3$ may be selected as reference first and second reception antennas. Furthermore, in the embodiment described above, the first linear array antenna 2 and the second linear array antenna 3 that is arranged at a height different from that of the first linear array antenna 2 are used. However, in addition to the first linear array antenna 2 and the second linear array antenna 3, one or more linear array antennas may be arranged at different heights, and angle estimation of incoming waves may be performed using the AF method. With linear array antennas configured as described above, angle estimation in two-dimensional directions of incoming waves can be performed with high accuracy using the AF method.

Figure 4:
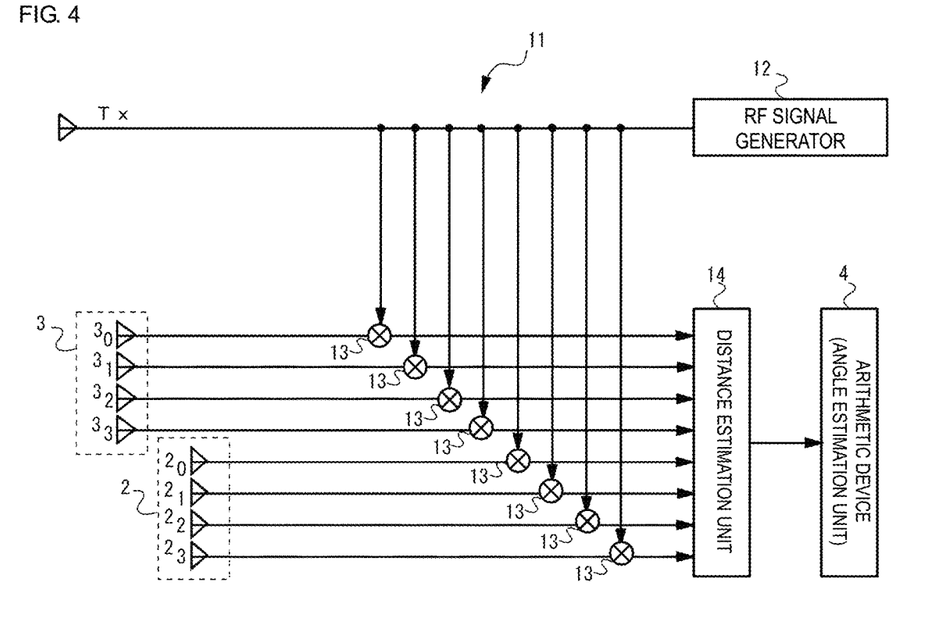
FIG. 4 is a block diagram illustrating a schematic configuration of a radar apparatus according to an embodiment of the present disclosure.

FIG. 4 is a block diagram illustrating a schematic configuration of a radar apparatus 11 of an FMCW (Frequency Modulated Continuous Wave) method according to an embodiment of the present disclosure configured to include the receiver 1 described above. In FIG. 4, the same or corresponding parts to those in FIG. 1 are given the same signs, and description of the same or corresponding parts will be omitted.

The radar apparatus 11 includes an RF (Radio Frequency) signal generator 12, a transmission antenna Tx, the first linear array antenna 2 and the second linear array antenna 3 each configuring reception antennas Rx, mixer units 13, a distance estimation unit 14, and the arithmetic device 4 including an angle estimation unit (the azimuth angle phase difference first estimation unit 4a, the azimuth angle phase difference second estimation unit 4b, the incoming wave signal first estimation unit 4c, the incoming wave signal second estimation unit 4d, the elevation angle phase difference estimation unit 4e, and the incoming direction two-dimensional estimation unit 4f). The first linear array antenna 2, the second linear array antenna 3, and the arithmetic device 4 configure the receiver 1 described above.

The RF signal generator 12 is a transmission signal generator that generates transmission signals and includes a voltage control oscillator and the like. The transmission antenna Tx emits transmission signals of millimeter waves or the like generated by the RF signal generator 12 and transmits the transmission signals as frequency-modulated continuous waves to an object, which is not illustrated in the drawing. The first linear array antenna 2 and the second linear array antenna 3 receive reflected waves obtained by reflection of transmission waves on the object. The mixer units 13 mix a transmission signal transmitted from the transmission antenna Tx with first reception signals x(0), x(1), x(2), and x(3) and second reception signals x(4), x(5), x(6), and x(7) of reflected waves received by the first linear array antenna 2 and the second linear array antenna 3, and convert the mixtures into intermediate frequency signals IF. In an alternative embodiment, the RF signal generator 12 and transmit antenna need not be in a same device as the receiver 1, and may be located remotely, such as adjacent to an roadway or an object that is illuminated by RF energy emitted from the transmit antenna. In another embodiment, a dedicated transmitter is not used to excite the object with RF energy, but signals of opportunity are collected by the receiver 1 after being reflected off the object 17.

The distance estimation unit 14 calculates distances R from the frequencies of the intermediate frequency signals IF obtained by the mixer units 13 to the object. The arithmetic device 4 performs angle estimation of the position of the object in the two-dimensional directions, on the basis of the elevation angles φ and the azimuth angles θ in the incoming directions of the incoming waves P and Q estimated as described above.

According to this embodiment, the FMCW radar apparatus 11 that is capable of accurately performing angle estimation in the two-dimensional directions, regarding the elevation angle φ and the azimuth angle θ of the object, and estimating the three-dimensional position of the object can be provided.

Figure 5:
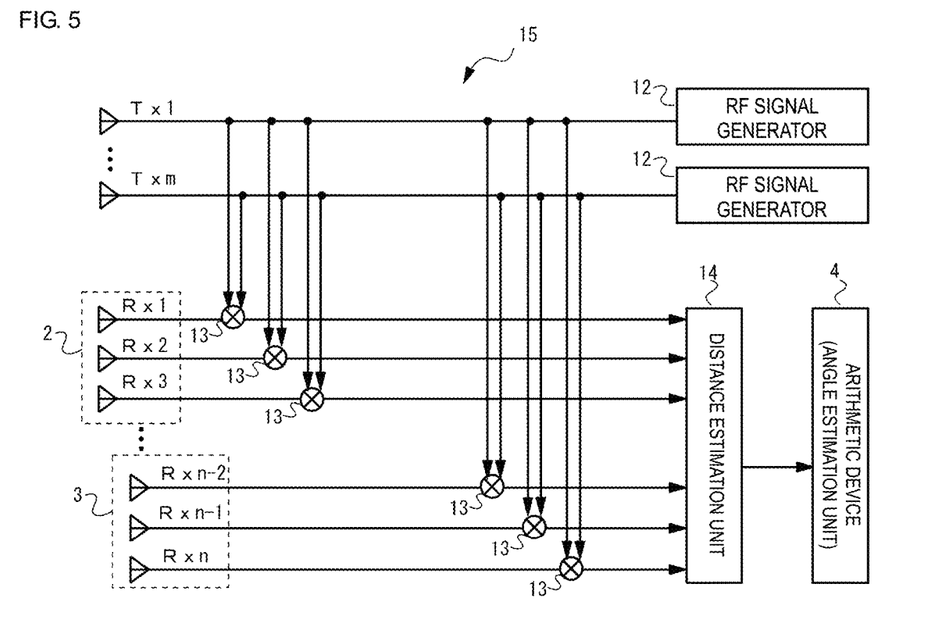
FIG. 5 is a block diagram illustrating a schematic configuration according to a modification of the radar apparatus illustrated in FIG. 4.

The radar apparatus 11 according to this embodiment including one transmission antenna Tx and eight reception antennas Rx has been described above. However, the number of the transmission antennas Tx and the number of the reception antennas Rx are not limited to those described above. For example, as in a MIMO radar apparatus 15 illustrated in FIG. 5, m transmission antennas Tx and n reception antennas Rx may be provided. In FIG. 5, the same or corresponding parts to those in FIG. 4 are given the same signs, and description of the same or corresponding parts will be omitted. Also in this case, with the reception antennas Rx configured in the first linear array antenna 2 and the second linear array antenna 3 that are arranged at different heights, the MIMO radar apparatus 15 that is capable of accurately performing angle estimation in the two-dimensional directions, regarding the elevation angle φ and the azimuth angle θ of an object, and estimating the three-dimensional position of the object can be provided, as with the radar apparatus 11 described above.

Figure 6:
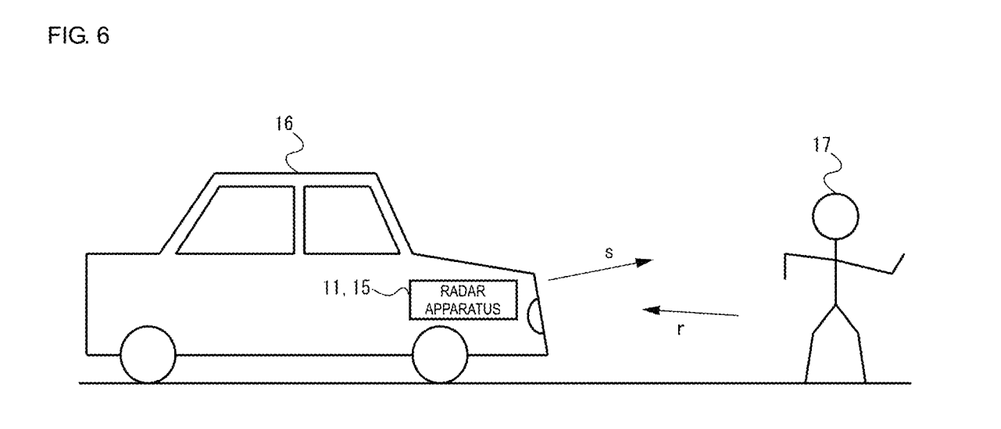
FIG. 6 is a diagram illustrating a schematic configuration of a vehicle including the radar apparatus illustrated in FIGS. 3 and 4.

FIG. 6 is a diagram illustrating a schematic configuration of a vehicle 16 according to an embodiment of the present disclosure including the radar apparatus 11 or the radar apparatus 15 described above.

The radar apparatus 11 or the radar apparatus 15 is provided at an appropriate position of the vehicle 16, in a front part of the vehicle 16 in this embodiment. A transmission wave "s" transmitted from the transmission antenna Tx of the radar apparatus 11 or 15 is reflected on an object 17 and is received as a reflected wave "r" by the first linear array antenna 2 and the second linear array antenna 3. The arithmetic device 4, which includes an angle estimation unit, estimates the elevation angle φ and the azimuth angle θ in the incoming direction of the reflected wave r, on the basis of the azimuth angle phase difference u and the elevation angle phase difference v between antennas, and the distance estimation unit 14 estimates the distance R to the object 17. The vehicle 16 estimates the three-dimensional position of the object 17, on the basis of the elevation angle φ and the azimuth angle θ in the incoming direction of the reflected wave r and the distance R to the object 17 estimated by the radar apparatus 11 or 15.

The vehicle 16 according to this embodiment is capable of identifying the three-dimensional position of the object 17 around the vehicle 16, while accurately performing angle estimation in the two-dimensional directions, regarding the elevation angle φ and the azimuth angle θ. Based on at least one aspect of the three dimensional position of the detected object 17, the radar apparatus 11 or 15 provides an input to a controller of the vehicle, which in turn controls at least one of an automated steering circuit that steers the vehicle to avoid contacting the object 17, an alarm that provides an audible and/or visual warning to the object 17, and a brake system that slows the vehicle to avoid contacting the object 17.

Figure 7:
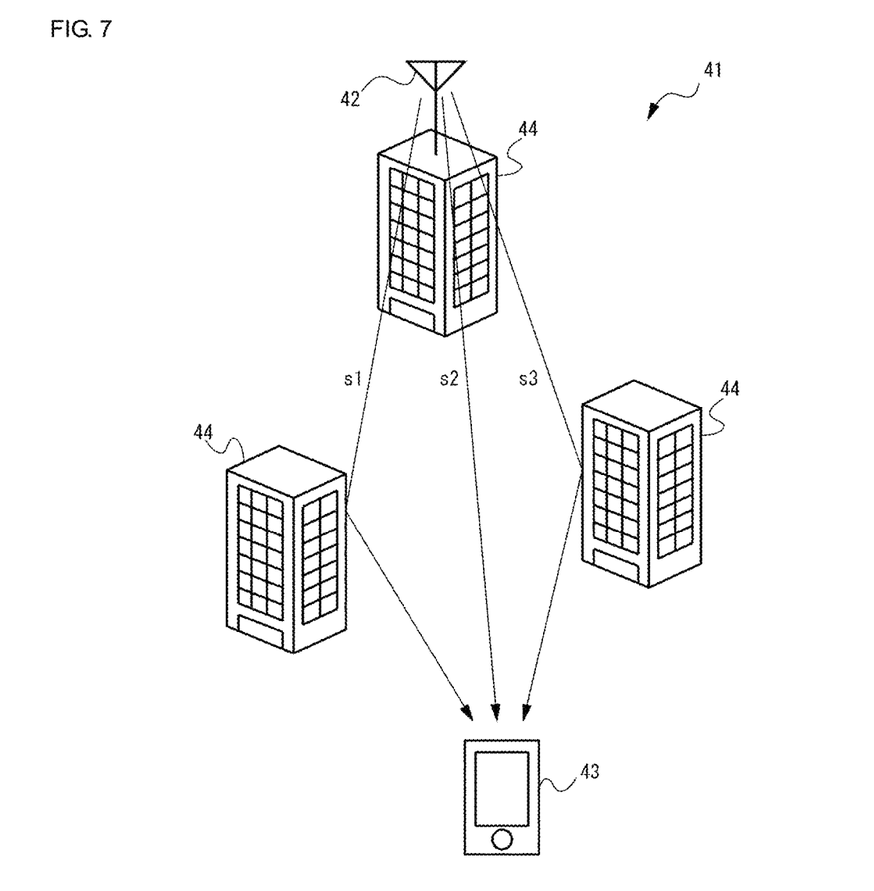
FIG. 7 is a diagram illustrating a schematic configuration of a communication system according to an embodiment of the present disclosure.

FIG. 7 is a diagram illustrating a schematic configuration of a communication system 41 according to an embodiment of the present disclosure including the receiver 1 described above.

The communication system 41 includes a base station 42 and a portable device such as a mobile phone 43. Transmission waves s1, s2, s3, and so on transmitted from the base station 42 are reflected on buildings 44 and the like and reach the mobile phone 43 from various directions. The base station 42 includes an angle estimation unit that configures the receiver 1 described above, a transmission unit that transmits the transmission waves s1, s2, s3, and so on, and a reception unit that receives reception waves r1, r2, r3, and so on received from the mobile phone 43 and configures the receiver 1 describe above. The angle estimation unit performs, in the two-dimensional directions, angle estimation of the position at which the mobile phone 43 that has transmitted an incoming wave is located, on the basis of the estimated elevation angle φ and azimuth angle θ in the incoming direction of the incoming wave. The transmission unit performs beamforming at the angle estimated by the angle estimation unit, and performs directivity control for increasing transmission output of the transmission waves s1, s2, s3, and so on transmitted towards the direction in which the mobile phone 43 is located. The reception unit performs beamforming at the angle estimated by the angle estimation unit, and performs directivity control for increasing the reception sensitivity of the reception waves r1, r2, r3, and so on received from the direction in which the mobile phone 43 is located.

In the communication system 41 according to this embodiment, the angle estimation unit of the base station 42 accurately performs, in the two-dimensional directions, angle estimation of the position at which the mobile phone 43 that has transmitted an incoming wave is located, regarding the elevation angle φ and the azimuth angle θ, and the transmission unit performs directivity control for increasing transmission output of the transmission waves s1, s2, s3, and so on toward the estimated angle. Thus, signals can be transmitted from the base station 42 to the mobile phone 43 efficiently. Therefore, even in the case where the mobile phone 43 that has transmitted an incoming wave is located far away, a transmission signal can arrive at the mobile phone 43 reliably. Furthermore, the reception level of the transmission signal to be received at the mobile phone 43 can be increased, and reliable communication with an excellent signal-to-noise ratio can be achieved.

Furthermore, in the communication system 41 according to this embodiment, the angle estimation unit accurately performs, in the two-dimensional directions, angle estimation of the position at which the mobile phone 43 that has transmitted an incoming wave is located, regarding the elevation angle φ and the azimuth angle θ, and the reception unit performs directivity control for increasing reception sensitivity of the reception waves r1, r2, r3, and so on toward the estimated angle. Thus, the reception sensitivity of signals from the mobile phone 43 received at the base station 42 can be increased. Therefore, even in the case where the mobile phone 43 that has transmitted an incoming wave is located far away, a transmission signal transmitted from the mobile phone 43 can be reliably received at the base station 42, and reliable communication with an excellent signal-to-noise ratio can be achieved.

In the embodiment described above, the case where the base station 42 includes the angle estimation unit that configures the receiver 1, the transmission unit that transmits the transmission waves s1, s2, s3, and so on, and the reception unit that receives the reception waves r1, r2, r3, and so on and configures the receiver 1 has been described. However, a portable device such as the mobile phone 43 may include the angle estimation unit, the transmission unit, and the reception unit described above.

That is, the mobile phone 43 is configured to include the angle estimation unit that configures the receiver 1 described above, the transmission unit that transmits the transmission waves s1, s2, s3, and so on, and the reception unit that receives the reception waves r1, r2, r3, and so on from the base station 42 and configures the receiver 1. The angle estimation unit performs, in the two-dimensional directions, angle estimation of the position at which the base station 42 that has transmitted an incoming wave is located, on the basis of the estimated elevation angle φ and azimuth angle θ in the incoming direction of the incoming wave. The transmission unit performs beamforming at the angle estimated by the angle estimation unit, and performs directivity control for increasing transmission output of the transmission waves s1, s2, s3, and so on transmitted towards the direction in which the base station 42 is located. The reception unit performs beamforming at the angle estimated by the angle estimation unit, and performs directivity control for increasing the reception sensitivity of the reception waves r1, r2, r3, and so on received from the direction in which the base station 42 is located.

With this configuration, the angle estimation unit of the mobile phone 43 accurately performs, in the two-dimensional directions, angle estimation of the position at which the base station 42 that has transmitted an incoming wave is located, regarding the elevation angle φ and the azimuth angle θ, and the transmission unit performs directivity control for increasing transmission output of the transmission waves s1, s2, s3, and so on toward the estimated angle. Thus, signals can be transmitted from the mobile phone 43 to the base station 42 efficiently. Therefore, even in the case where the base station 42 that has transmitted an incoming wave is located far away, a transmission signal can arrive at the base station 42 reliably. Furthermore, the reception level of the transmission signal to be received at the base station 42 can be increased, and reliable communication with an excellent signal-to-noise ratio can be achieved.

Furthermore, with this configuration, the angle estimation unit accurately performs, in the two-dimensional directions, angle estimation of the position at which the base station 42 that has transmitted an incoming wave is located, regarding the elevation angle φ and the azimuth angle θ, and the reception unit of the mobile phone 43 performs directivity control for increasing reception sensitivity of the reception waves r1, r2, r3, and so on toward the estimated angle. Thus, the reception sensitivity of signals from the base station 42 received at the mobile phone 43 can be increased. Therefore, even in the case where the base station 42 that has transmitted an incoming wave is located far away, a transmission signal transmitted from the base station 42 can be reliably received at the mobile phone 43, and reliable communication with an excellent signal-to-noise ratio can be achieved.

Figure 8:
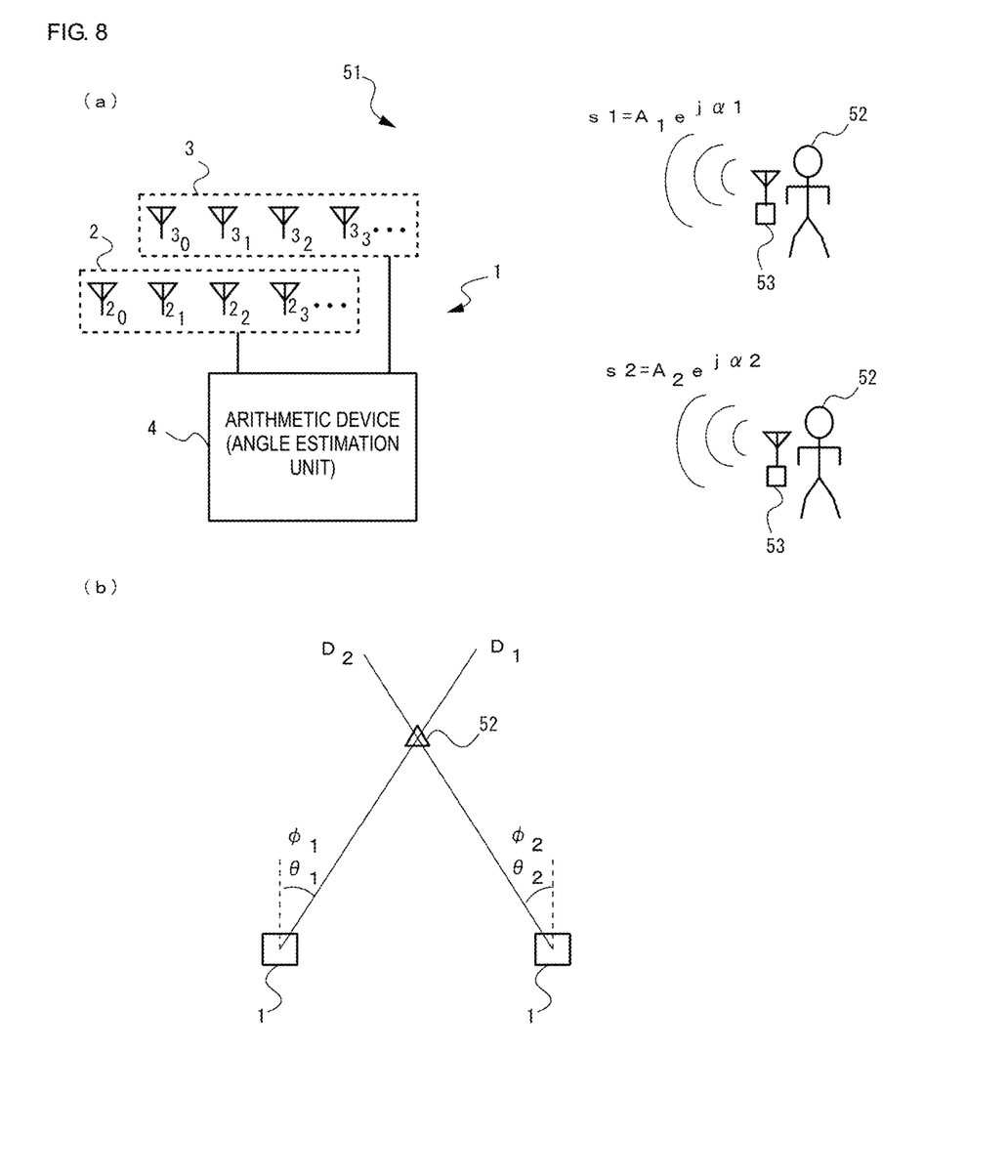
FIG. 8 includes diagrams illustrating a schematic configuration of a position detection system according to an embodiment of the present disclosure.

FIG. 8(a) is a diagram illustrating a schematic configuration of a position detection system 51 according to an embodiment of the present disclosure including the receiver 1 described above. In FIG. 8, the same or corresponding parts to those in FIG. 1 are given the same signs, and description of the same or corresponding parts will be omitted.

The position detection system 51 includes a plurality of transmitters 53 that are attached to targets 52 and transmit transmission waves s1, s2, and so on and the receiver 1 in which the transmission waves s1, s2, and so on output from the transmitters 53 are received as incoming waves at the first linear array antenna 2 and the second linear array antenna 3. The receiver 1 performs, in the two-dimensional directions, angle estimation of the position at which each of the targets 52 is located, on the basis of the estimated elevation angle φ and azimuth angle θ in the incoming direction of the incoming wave.

According to this embodiment, the position detection system 51 that is capable of accurately performing, in the two-dimensional directions, angle estimation of the position at which each of the targets 52 is located, regarding the elevation angle φ and the azimuth angle θ, can be provided.

According to this embodiment, for example, as illustrated in FIG. 8(b), two receivers 1 are provided, and angle estimation in the two-dimensional directions is performed, regarding elevation angles $\varphi_1$ and $\varphi_2$ and azimuth angles $\theta_1$ and $\theta_2$ of each target 52 estimated by the receivers 1, on the basis of the transmission waves s1, s2, and so on transmitted from the transmitter 53. Thus, position estimation based on an AOA (Angle of Arrival) method can be performed. That is, the three-dimensional position of the target 52 can be accurately estimated on the basis of the position of intersection of directions D1 and D2 estimated by the receivers 1. Two receivers 1 are not necessarily provided. The two-dimensional position of the target 52 can be accurately detected by a single receiver 1. REFERENCE SIGNS LIST 1 . . . receiver
2 . . . first linear array antenna
$2_0$ to $2_3$ . . . first reception antenna
3 . . . second linear array antenna
$3_0$ to $3_3$ . . . second reception antenna
4 . . . arithmetic device
4a . . . azimuth angle phase difference first estimation unit
4b . . . azimuth angle phase difference second estimation unit
4c . . . incoming signal first estimation unit
4d . . . incoming signal second estimation unit
4e . . . elevation angle phase difference estimation unit
4f . . . incoming direction two-dimensional estimation unit
5 . . . filter
11 . . . FMCW radar apparatus
12 . . . RF signal generator
13 . . . mixer unit
14 . . . distance estimation unit 15 . . . MIMO radar apparatus
16 . . . vehicle
17 . . . object
41 . . . communication system
42 . . . base station
43 . . . mobile phone (portable device)
44 . . . building
51 . . . position detection system
52 . . . target
53 . . . transmitter

The invention claimed is:

1. A receiver comprising:
azimuth angle phase difference first estimation circuitry configured to
input a plurality of first reception signal groups each including first reception signals received at a plurality of first reception antennas that are part of a first linear array antenna, a number of the first reception signals being larger than a number of incoming waves by one, and
apply a first annihilation filter (AF) to the first reception signal groups to estimate azimuth angle phase differences of the incoming waves for respective of the first reception antennas, the estimate of azimuth angle phase differences for the first reception antennas being based on phases that occur at zeros of a transfer function of the first AF;
azimuth angle phase difference second estimation circuitry configured to
input a plurality of second reception signal groups each including second reception signals received at a plurality of second reception antennas that are part of a second linear array antenna arranged at a height that is different than the first linear array antenna, a number of the second reception signals being larger than the number of the incoming waves by one, and
apply a second AF to the second reception signal groups to estimate azimuth angle phase differences of the incoming waves for respective of the second reception antennas, the estimate of the azimuth angle phase differences of the incoming waves for the second reception antennas being based on phases that occur at zeros of a transfer function of the second AF;
incoming wave signal first estimation circuitry that estimates amplitudes and phases of signals of the incoming waves that arrive at a reference first reception antenna that is included in the first linear array antenna, based on azimuth angle phase differences of incoming waves among the first reception antennas estimated by the azimuth angle phase difference first estimation circuitry and the first reception signals;
incoming wave signal second estimation circuitry that estimates amplitudes and phases of signals of incoming waves arriving at a reference second reception antenna that is included in the second linear array antenna, based on the azimuth angle phase differences of the incoming waves among the second reception antennas estimated by the azimuth angle phase difference second estimation circuitry and the second reception signals;
elevation angle phase difference estimation circuitry that estimates phase differences that correspond to the height for the incoming waves as elevation angle phase differences, based on the signals estimated by the incoming wave signal first estimation circuitry that arrive at the reference first reception antenna and the signals estimated by the incoming wave signal second estimation circuitry that arrive at the reference second reception antenna; and
incoming direction two-dimensional estimation circuitry that is configured to
estimate elevation angles of incoming directions of incoming waves based on the elevation angle phase differences estimated by the elevation angle phase difference estimation circuitry, and
estimate azimuth angles of incoming directions of incoming waves based on the azimuth angle phase differences estimated by the azimuth angle phase difference first estimation circuitry or the azimuth angle phase difference second estimation circuitry.

2. The receiver of claim 1, further comprising:
the first linear array antenna that includes the plurality of first reception antennas arranged with an equal interval therebetween and arranged in a straight line, a number of the first reception antennas being larger than a number of incoming waves by at least one, wherein
the plurality of first reception antennas are configured to receive first reception signals having amplitudes corresponding to the incoming waves and having different phases corresponding to the equal interval and relative to incoming waves received at the reference first reception antenna.

3. The receiver of claim 2, further comprising:
the second linear array antenna that includes the plurality of second reception antennas arranged with the equal interval therebetween and also in a straight line parallel to the straight line in which the plurality of first reception antennas are arranged, a number of the second reception antennas being larger than a number of the incoming waves by at least one, wherein
the plurality of second reception antennas are configured to receive second reception signals having amplitudes corresponding to the incoming waves and having different phases corresponding to the equal interval and relative to incoming waves received at the reference second reception antenna.

4. The receiver of claim 3, wherein
the number of incoming waves is two,
the respective transfer functions, H(z) of the first AF and the second AF are characterized as
$H(z)=h_0 z^2+h_1 z+h_2$, wherein z is phase difference, and $h_0$, $h_1$, and $h_2$, are filter coefficients, and
under a condition the first reception group is expressed as x(2), x(1), and x(0), and the second first reception group is expressed as x(3), x(2), and x(1), filter outputs for the first AF occurring at zero is characterized as $h_0 x(2)+h_1 x(1)+h_2 x(0)=0$, and filter outputs for the second AF occurring at zero is characterized as $h_0 x(3)+h_1 x(2)+h_2 x(1)=0$.

5. The receiver of claim 4, wherein
under a condition x(0), x(1), x(2), and x(3) are respectively characterized as, $x(0)=A_1 e^{j\alpha_1}+A_2 e^{j\alpha_2}$ $x(1)=A_1 e^{j(\alpha_1+u_1)}+A_2 e^{j(\alpha_2+u_2)}$ $x(2)=A_1 e^{j(\alpha_1+2u_1)}+A_2 e^{j(\alpha_2+2u_2)}$ $x(3)=A_1 e^{j(\alpha_1+3u_1)}+A_2 e^{j(\alpha_2+3u_2)}$, and $h_0 x(2)+h_1 x(1)+h_2 x(0)$, is set to zero and characterized as $$\begin{aligned}&h_0x(2)+h_1x(1)+h_2x(0)\\&=h_0(A_1e^{j(\alpha_1+2u_1)}+A_2e^{j(\alpha_2+2u_2)})+\\&\qquad h_1(A_1e^{j(\alpha_1+u_1)}+A_2e^{j(\alpha_2+u_2)})+h_2(A_1e^{j\alpha_1}+A_2e^{j\alpha_2})\\&=A_1e^{j\alpha_1}\frac{(h_0e^{j2u_1}+h_1e^{ju_1}+h_2)}{\text{COMMON PART }a}+A_2e^{j\alpha_2}\frac{(h_0e^{j2u_2}+h_1e^{ju_2}+h_2)}{\text{COMMON PART }b}\\&=0,\end{aligned}$$

and $h_0x(3)+h_1x(2)+h_2x(1)$ is set to zero and characterized as $$\begin{aligned}&h_0x(3)+h_1x(2)+h_2x(1)\\&=h_0(A_1e^{j(\alpha_1+3u_1)}+A_2e^{j(\alpha_2+3u_2)})+\\&\qquad h_1(A_1e^{j(\alpha_1+2u_1)}+A_2e^{j(\alpha_2+2u_2)})+h_2(A_1e^{j(\alpha_1+u_1)}+A_2e^{j(\alpha_2+u_2)})\\&=A_1e^{j(\alpha_1+u_1)}\frac{(h_0e^{j2u_1}+h_1e^{ju_1}+h_2)}{\text{COMMON PART }a}+A_2e^{j(\alpha_2+u_2)}\frac{(h_0e^{j2u_2}+h_1e^{j\alpha_2}+h_2)}{\text{COMMON PART }b}\\&=0,\end{aligned}$$

the azimuth angle phase difference first estimation circuitry, and azimuth angle phase difference first estimation circuitry are further configured to calculate filter coefficients $h_0$, $h_1$, and $h_2$ so that common part a and common part b converge to zero.

6. The receiver according to claim 1, wherein the azimuth angle phase difference first estimation circuitry, and the azimuth angle phase difference second estimation circuitry are implemented together in common circuitry.

7. The receiver according to claim 6, wherein at least one of the incoming wave signal first estimation circuitry, the incoming wave signal second estimation circuitry, the elevation angle phase difference estimation circuitry, or the incoming direction two-dimensional estimation circuitry is implemented in the common circuitry.

8. The receiver according to claim 6, wherein the common circuitry is contained on a single chip, or a single module board.

9. The receiver according to claim 1, wherein the azimuth angle phase difference first estimation circuitry, and the azimuth angle phase difference second estimation circuitry are implemented in separate circuits.

10. The receiver according to claim 9, wherein the separate circuits include at least one circuit connected to another circuit via one or more conductive paths.

11. The receiver according to claim 10, wherein the separate circuits include the at least one circuit connected to a third circuit via a wireless communication connection.

12. A radar apparatus comprising:
the receiver according to claim 1;
a transmission signal generator that generates a transmission signal;
a transmission antenna that transmits, as a transmission wave, the transmission signal generated by the transmission signal generator; and
object detection circuitry configured to
perform, in two-dimensional directions, angle estimation of a position of an object based on elevation angles and azimuth angles of incoming directions of incoming waves estimated by the receiver, the incoming waves being waves that result as a consequence of the transmission wave being reflected off the object, and
estimate a distance to the object.

13. The radar apparatus according to claim 12, further comprising:
a mixer that mixes a reception signal of one or more waves that result as a consequence of the transmission wave being reflected off the object, wherein the transmission wave being a frequency-modulated continuous wave and the one or more waves being received at the first linear array antenna and the second linear array antenna, and the mixer is further configured to convert the mixed reception signal and transmission signal into an intermediate frequency signal,
wherein the object detection circuitry is configured to estimate the distance to the object based on a frequency of the intermediate frequency signal obtained by the mixer.

14. A vehicle comprising the radar apparatus according to claim 12.

15. A vehicle comprising the radar apparatus according to claim 13.

16. A communication system comprising:
the receiver according to claim 1;
angle estimation circuitry provided in a base station or a portable device and configured to estimate, in two-dimensional directions, configured to estimate an angle corresponding to a position at which the portable device or the base station that has transmitted incoming waves is located based on elevation angles and azimuth angles of the incoming waves estimated by the receiver; and
a transmitter provided in the base station or the portable device that is configured to
perform beamforming directed to the angle estimated by the angle estimation circuitry, and
perform directivity control to increase transmission output of a transmission wave transmitted towards the position in which the portable device or the base station is located.

17. A communication system comprising:
the receiver according to claim 1;
angle estimation circuitry provided in a base station or a portable device and configured to estimate, in two-dimensional directions, configured to estimate an angle corresponding to a position at which the portable device or the base station that has transmitted incoming waves is located based on elevation angles and azimuth angles of the incoming waves estimated by the receiver; and
another receiver that is provided in the portable device or the base station, the another receiver is configured to
perform beamforming at the angle estimated by the angle estimation circuitry, and
perform directivity control to increase reception sensitivity of a reception wave received from a direction corresponding to the position in which the base station or the portable device is located.

18. A position detection system comprising:
the receiver according to claim 1;
a plurality of transmitters that output transmission waves and are attached to targets; and
angle estimation circuitry that performs, in two-dimensional directions, angle estimation of a position at which each of the targets is located based on elevation angles and azimuth angles of directions of incoming waves estimated by the receiver, wherein the receiver receives each of the transmission waves output from the plurality of transmitters as the incoming waves.

19. A reception method comprising:
receiving a plurality of first reception signal groups each including first reception signals received at a plurality of first reception antennas that are part of a first linear array antenna, a number of the first reception signals being larger than a number of incoming waves by one;
applying a first annihilation filter (AF) to the first reception signal groups to estimate azimuth angle phase differences of the incoming waves among the first reception antennas, based on phases that occur at zeros of a transfer function of the first AF;
receive a plurality of second reception signal groups each including second reception signals received at a plurality of second reception antennas that are part of a second linear array antenna arranged at a height that is different than the first linear array antenna, a number of the second reception signals being larger than the number of the incoming waves by one;
apply a second AF to the second reception signal groups to estimate azimuth angle phase differences of the incoming waves among the second reception antennas, based on phases that occur at zeros of a transfer function of the second AF;
estimate amplitudes and phases of signals of the incoming waves arriving at a reference first reception antenna included in the first linear array antenna, based on azimuth angle phase differences of incoming waves among the first reception antennas previously estimated and the first reception signals;
estimating amplitudes and phases of signals of incoming waves arriving at a reference second reception antenna included in the second linear array antenna, based on the azimuth angle phase differences of the incoming waves among the second reception antennas previously estimated and the second reception signals;
estimating phase differences that correspond to height for the incoming waves as elevation angle phase differences, based on the signals previously estimated to arrive at the reference first reception antenna and the signals estimated to arrive at the reference second reception antenna; and
estimating elevation angles of incoming directions of incoming waves based on the elevation angle phase differences, and
estimating azimuth angles of incoming directions of incoming waves based on the azimuth angle phase differences previously estimated.

20. A non-transitory computer storage medium having computer readable instructions stored therein that perform a reception method when executed by a processor, the reception method comprising:
receiving a plurality of first reception signal groups each including first reception signals received at a plurality of first reception antennas that are part of a first linear array antenna, a number of the first reception signals being larger than a number of incoming waves by one;
applying a first annihilation filter (AF) to the first reception signal groups to estimate azimuth angle phase differences of the incoming waves among the first reception antennas, based on phases that occur at zeros of a transfer function of the first AF;
receive a plurality of second reception signal groups each including second reception signals received at a plurality of second reception antennas that are part of a second linear array antenna arranged at a height that is different than the first linear array antenna, a number of the second reception signals being larger than the number of the incoming waves by one;
apply a second AF to the second reception signal groups to estimate azimuth angle phase differences of the incoming waves among the second reception antennas, based on phases that occur at zeros of a transfer function of the second AF;
estimate amplitudes and phases of signals of the incoming waves arriving at a reference first reception antenna included in the first linear array antenna, based on azimuth angle phase differences of incoming waves among the first reception antennas previously estimated and the first reception signals;
estimating amplitudes and phases of signals of incoming waves arriving at a reference second reception antenna included in the second linear array antenna, based on the azimuth angle phase differences of the incoming waves among the second reception antennas previously estimated and the second reception signals;
estimating phase differences that correspond to height for the incoming waves as elevation angle phase differences, based on the signals previously estimated to arrive at the reference first reception antenna and the signals estimated to arrive at the reference second reception antenna; and
estimating elevation angles of incoming directions of incoming waves based on the elevation angle phase differences, and
estimating azimuth angles of incoming directions of incoming waves based on the azimuth angle phase differences previously estimated.

* * * * *